US006952719B1

(12) United States Patent
Harris

(10) Patent No.: US 6,952,719 B1
(45) Date of Patent: Oct. 4, 2005

(54) SPAM DETECTOR DEFEATING SYSTEM

(76) Inventor: Scott C. Harris, P.O. Box 927649, San Diego, CA (US) 92192

(*) Notice: Subject to any disclaimer, the term of this patent is extended or adjusted under 35 U.S.C. 154(b) by 277 days.

(21) Appl. No.: 09/682,599

(22) Filed: Sep. 25, 2001

Related U.S. Application Data

(60) Provisional application No. 60/235,433, filed on Sep. 26, 2000.

(51) Int. Cl.[7] ........................ G06F 15/16; G06F 15/173

(52) U.S. Cl. ...................... 709/206; 709/206; 709/223; 709/225; 709/232

(58) Field of Search ................................ 709/206, 207, 709/223, 229, 201, 203, 225, 232; 707/10

(56) References Cited

U.S. PATENT DOCUMENTS

| | | | | | |
|---|---|---|---|---|---|
| 5,619,648 | A | * | 4/1997 | Canale et al. | 709/206 |
| 5,970,492 | A | * | 10/1999 | Nielsen | 707/10 |
| 5,996,011 | A | * | 11/1999 | Humes | 709/225 |
| 5,999,932 | A | * | 12/1999 | Paul | 707/10 |
| 6,161,130 | A | * | 12/2000 | Horvitz et al. | 709/206 |
| 6,321,267 | B1 | * | 11/2001 | Donaldson | 709/229 |
| 6,393,465 | B2 | * | 5/2002 | Leeds | 709/207 |
| 6,421,709 | B1 | * | 7/2002 | McCormick et al. | 709/206 |
| 6,434,601 | B1 | * | 8/2002 | Rollins | 709/206 |
| 6,460,074 | B1 | * | 10/2002 | Fishkin | 709/206 |
| 6,484,197 | B1 | * | 11/2002 | Donohue | 709/206 |
| 6,546,416 | B1 | * | 4/2003 | Kirsch | 709/206 |
| 6,615,242 | B1 | * | 9/2003 | Riemers | 709/206 |
| 6,650,890 | B1 | * | 11/2003 | Irlam et al. | 455/412.1 |
| 6,654,787 | B1 | * | 11/2003 | Aronson et al. | 709/206 |

* cited by examiner

*Primary Examiner*—Ario Etienne
*Assistant Examiner*—Ramy Osman
(74) *Attorney, Agent, or Firm*—Scott C. Harris

(57) ABSTRACT

A system for detecting random information in an electronic communication, and recognizing the electronic information as being undesired information, e.g. Spam, when such random information is detected. The random information can be random characters, random words, or the like. The random words can be detected by comparing the words with a dictionary, and selecting words as being random when they do not match the dictionary. A matching criteria less than 100% may be established to accommodate words which are not in the dictionary and typographical errors.

12 Claims, 2 Drawing Sheets

SPAM DETECTOR DEFEATING SYSTEM

CROSS REFERENCE TO RELATED APPLICATIONS

This application claims the benefit of the U.S. Provisional Application No. 60/235,433, filed on Sep. 26, 2000.

BACKGROUND OF INVENTION

Spam, or unwanted emails and web pages can cause problems, including lost productivity based on the time that a user spends reading the spam. It is often desired to remove or block these messages. Different systems attempt to do so.

For emails, certain filtering systems exist. These filtering systems often work on the address level; i.e. certain users are blocked from sending further emails. My co-pending application Ser. No. 09/690,002 also describes another system which uses rules to remove Spam.

Spam can take another form—specifically unwanted web pages. Certain web pages cause other web pages to open as so-called pop up windows. The theory is that a user will look at these, at very least while closing the window. Certain pop up window detectors such as POW!, available from www.analogx.com, kills unwanted pop ups immediately when they occur. However, POW! operates by the same system as disclosed above: specifically it detects an address which is programmed into a database of addresses, and uses that to make the decision to close the primary window.

SUMMARY OF INVENTION

The present application teaches different ways of defeating such systems as well as different countermeasures, which might defeat the defeating systems.

BRIEF DESCRIPTION OF DRAWINGS

These and other aspects will now be described in detail with reference to the accompanying drawings wherein.

DETAILED DESCRIPTION

Figure 1:
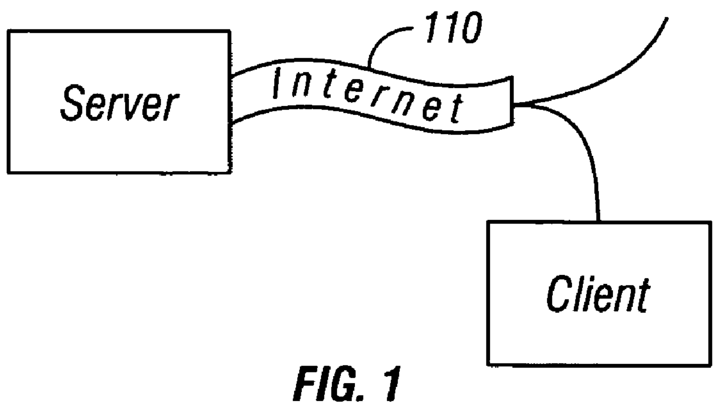
FIG. 1 shows a client and server connected via the Internet.

The basic structure is shown in FIG. 1, which shows an Internet server 100, connected to the Internet 110. The Internet server runs a program which can include an Internet server program such as Apache or IIS, and/or an email server or communication program. The server can carry out operations which are known in the art to either open pop up windows, or send Spam (unsolicited) email, or other unrequested advertising actions to the client 120.

Figure 4:
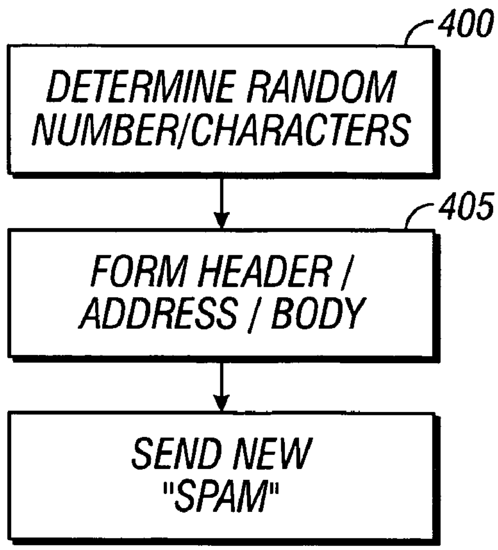
FIG. 4 shows a flowchart of sending spam.

FIG. 4 shows a first flowchart which is operated by a sender, to send "Spam"; where Spam can be any communication, e.g. an email, web page, or other electronic communication which automatically sent to a user, without being specifically requested by the user, and can especially include advertising-oriented communications of this type. Examples of Spam include unsolicited emails, emails sent from an email mailing list, and pop up Internet windows.

The described system attempts to defeat these conventional ways of detecting Spam emails. At 400, the system determines a set of random elements. These can be random numbers, random characters, or any other random element. This can be based on a random number generator, or a random seed. Any ASCII character can be used, or only numbers or letters or any subset thereof.

At 405, the random number is incorporated into the Spam in some way, and becomes part of the Spam message, as explained below.

Figure 2:
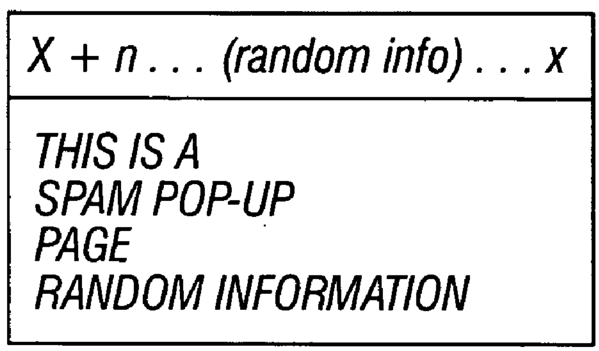
FIG. 2 shows a spam pop-up.

FIG. 2 shows a pop up window. In a first embodiment, the random number 200 is used as part of the web page name 199. Therefore, the web page name either is the random number itself, or incorporates the random number as part of the name. The content is shown as 205.

Here it says, "this is a Spam pop up page". The content may also include the random character therein.

Rule-based Spam-killing systems, such as disclosed in my application described above, simply look for information that fits the characteristics of a previously defined rule. This system, in contrast, changes the way the Spam looks, virtually every time it makes the Spam. Therefore, this system may allow the Spam messages to come through, even when a rule based system is attempting to block them.

Certain "list based" detecting programs are specifically looking for the specific information that has been identified as part of the Spam. For example, POW may look for a web page having a name on a list. If a web page is named "Buy this book", and that term is on the list, then POW kills all web pages that are named that. Since this system names all the pop up windows differently (using the random character that will not, in general, be the same), that same specific information will not be found. Hence, these SPAM detectors will not detect that specific information and will not remove the Spam. Moreover, since a random number is generated, and a different random number may be used each time, the name always changes; and the conventional lists are not capable of preventing this Spam from reaching its target.

Figure 3:
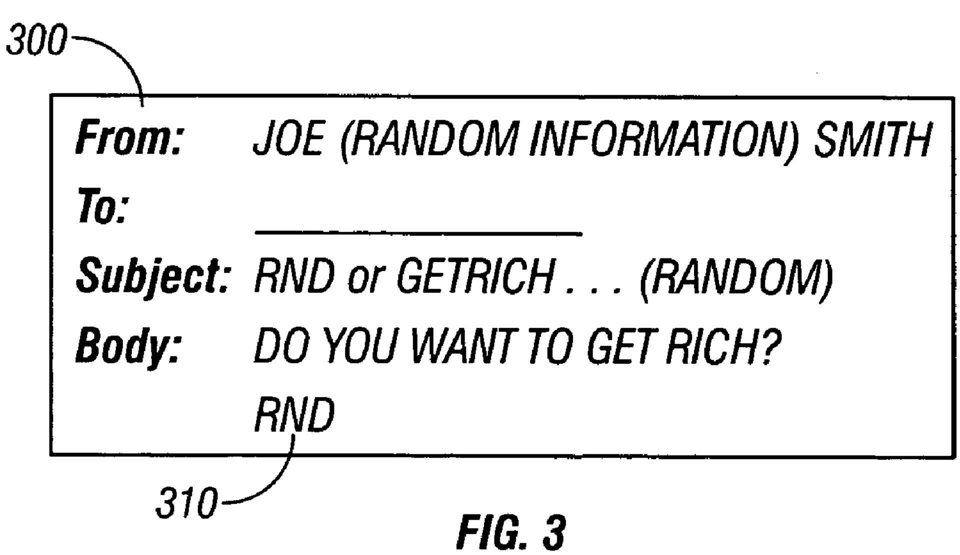
FIG. 3 shows a spam email.

FIG. 3 shows an alternative when used for creating email. The return address includes a random character, e.g., a random number, therein. It can include only the random character or the random character along with other information; shown as 300. The subject may also include the random character shown as 305. The body can also have the random character therein, shown as 310. The present system may work on Spam based emails, also.

Figure 5:
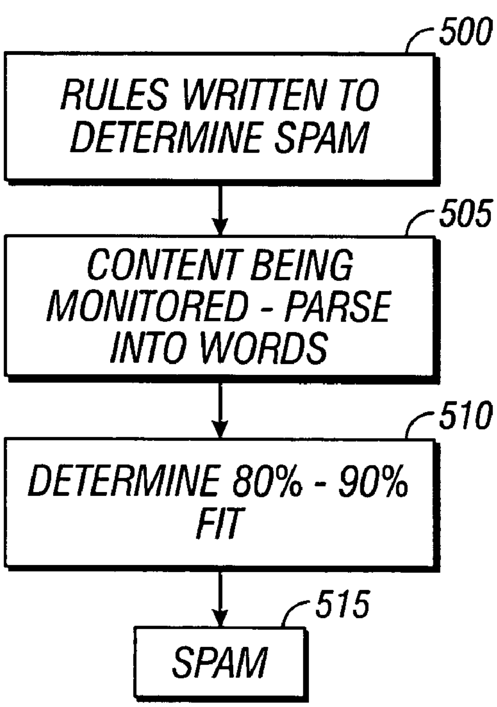
FIG. 5 shows a first spam defeating system.

Another embodiment discloses a technique to defeat such a random character based system. FIG. 5 shows a system in which rules are written to determine the content of Spam. Again, the Spam can be in any description of electronic communication, e.g. in a pop-up page or in an email. According to these rules, the content being monitored is parsed into "words" at 505. These words can be different groups of characters which have spaces between them, or can be defined some other way such as by using a dictionary to find real words or just chunks of characters which form words, phonemes or any other unit.

At 510, an 80 or 90% fit is determined.

Alternatively, an exact fit of a specified number of characters, e.g., 15 characters, is determined. This latter system may be more useful when very long random characters are used.

When such a fit between the words being searched and the words in the email is determined, the message is determined to be Spam at 515. When the fit is not determined, the message is determined not to be Spam, and the message is delivered at 520. By operating to detect some coincidence less than 100%, e.g., 80–90%, the addition of random characters may not defeat the system from detecting this kind of Spam, even though it does not that exactly meet the description in the list.

Figure 6:
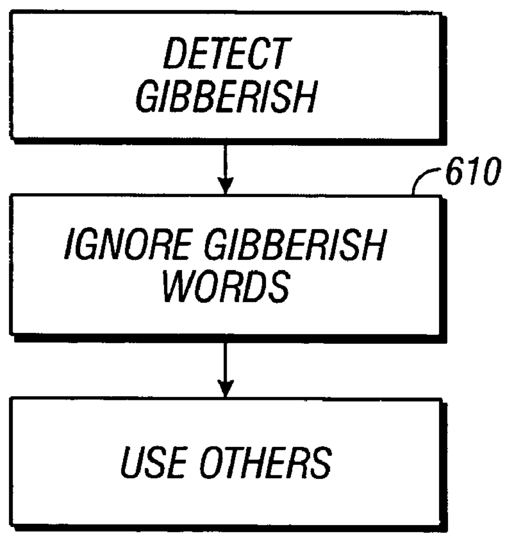
FIG. 6 shows a way of distinguishing spam.

Another technique of detecting this kind of "random spam" is shown in FIG. 6. The message is parsed into words at 600. The system detects gibberish, i.e. a series of random characters. This can be done by parsing the content into words which are compared against a dictionary. When the word is not within the dictionary (which can be a limited kind of dictionary if desired), then the word is established to be gibberish, and hence ignored, at 610. When the word is in the dictionary, the word is compared with the rules and/or list.

Another embodiment describes a way of defeating this kind of system described in FIG. 6. This technique uses real words as the elements that are randomly-selected. The words are from within a dictionary of words. In this way, instead of the random characters being completely random, they include real words from a dictionary, but those real words are concatented in a random way. Either one word, or a number of words from a dictionary of words can be used. The words are randomly selected, thereby making these words randomly selected elements. Each message is still different; since each will contain different random words. Even if gibberish words are ignored, the rule based and/or list based systems may still fail to detect Spam that is marked in this way.

Still, each time the pop up window is made and/or a new Spam email is sent, random content is contained within that new window. In that way, it becomes more difficult for automated detectors to remove the Spam.

Other modifications are possible. For example, the descriptors may be any descriptor that is associated with a message; which may include, not only addresses, but also metatags, style sheets, or any other kind of information that is associated with a message.

What is claimed is:

1. An article, comprising:

a machine readable medium which stores machine executable instructions, the instructions causing a computer to:

receiving an electronic communication over a channel;

detect random information in said electronic communication that has been received over the channel; and establish said electronic communication as possibly being an undesired electronic communication based on said detect of said random information, wherein said random information includes a plurality of random characters, and wherein said detect random characters comprises comparing a content of said electronic communication to a dictionary of words, and establishing parts within said electronic communication that are not within said dictionary as being random characters.

2. An article as in claim 1, wherein said random information includes a plurality of random words.

3. An article as in claim 1, wherein said detect random information comprises detecting specified words which include additional random information associated therewith.

4. An article as in claim 1, wherein said electronic communication is one of an e-mail or a web page.

5. An article as in claim 1, further comprising an instruction to filter said electronic communication based on said instructions to establish said electronic communication as being an undesired communication.

6. A method, comprising:

receiving an electronic communication;

detecting random information within said electronic communication; and filtering said electronic communication, prior to reaching a user, responsive to said detecting;

wherein said random information includes random characters; and wherein said random information includes random words, and said detecting comprises comparing said electronic communication with a dictionary of words, and establishing items which do not match any parts of said dictionary as being said random information.

7. A method as in claim 6, wherein said filtering comprises restricting said electronic communication from reaching said user, when said detecting detects said random information within said electronic communication.

8. A method as in claim 6, further comprising defining rules which determine which electronic communications should be filtered, and detecting said electronic communications based on said rules.

9. An article, comprising:

a machine readable medium which stores machine-executable instructions, the instructions causing a machine to:

process electronic communications which have been received over a channel according to rules which define characteristics of said electronic communications which will be filtered prior to reaching the user; and establishing said electronic communication as being ones which will be filtered when content of electronic communication matches said rules by a specified amount less than 100%, wherein said establishing comprises establishing said electronic communication as being a spam communication.

10. An article as in claim 9, wherein said instructions to establish include instructions to determine a random content within said electronic communication in addition to a content defined by said rules.

11. An article as in claim 9, wherein said establishing establishes the communication as one to be filtered when the content matches by 80–90% percent or more.

12. An article as in claim 10, wherein said random content is determined by comparing said content with a database.

* * * * *